(12) United States Patent
Maucher

(10) Patent No.: US 6,213,097 B1
(45) Date of Patent: Apr. 10, 2001

(54) ENGINE WORKING ACCORDING TO THE METHOD OF PULSATING COMBUSTION

(75) Inventor: Beate Maucher, Böblingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/269,486

(22) PCT Filed: Sep. 19, 1997

(86) PCT No.: PCT/DE97/02129

§ 371 Date: Dec. 27, 1999

§ 102(e) Date: Dec. 27, 1999

(87) PCT Pub. No.: WO98/14694

PCT Pub. Date: Apr. 9, 1998

(30) Foreign Application Priority Data

Sep. 30, 1996 (DE) .......................... 196 40 191. 7

(51) Int. Cl.[7] ........................................ F02B 71/00
(52) U.S. Cl. ............................... 123/465 C; 60/595
(58) Field of Search .................... 60/595; 123/46 R, 123/465 C, 46 E; 417/380

(56) References Cited

U.S. PATENT DOCUMENTS

| 2,829,276 | * | 4/1958 | Jarret et al. | .................. | 123/46 E |
| 3,208,439 | * | 9/1965 | Ulbing | .................. | 123/465 SC |
| 4,777,801 | | 10/1998 | Porter | .................. | 60/595 |
| 4,962,641 | | 10/1990 | Ghougasian | .................. | 60/249 |
| 5,361,581 | | 11/1994 | Clark | .................. | 60/247 |

FOREIGN PATENT DOCUMENTS

| 43 15 046 | 11/1994 | (DE) . |
| 881 347 | 11/1961 | (GB) . |

* cited by examiner

Primary Examiner—Noah P. Kamen
(74) Attorney, Agent, or Firm—Kenyon & Kenyon

(57) ABSTRACT

A combustion engine based on the principle of pulsating combustion and a method of operating the engine includes a pressure-resistant housing in which a combustion chamber is provided, an intake mechanism for fuel and combustion air, and an exhaust mechanism connected to the combustion chamber for the exhaust gases produced during combustion. A piston is movably arranged in a cylinder which is connected to the combustion chamber, with spring energy being applied to the piston on the side facing away from the combustion chamber. This effectively transfers the energy of the pressure waves produced during pulsating combustion to a mechanical driving element.

14 Claims, 1 Drawing Sheet

ENGINE WORKING ACCORDING TO THE METHOD OF PULSATING COMBUSTION

BACKGROUND INFORMATION

The present invention relates to an engine based on the principle of pulsating combustion and a method for operating the engine. Previously proposed gas turbines based on the principle of pulsating combustion, in which energy of the pressure waves reaching the outside via an exhaust pipe is transmitted to a turbine wheel are described in the publication entitled The Pulsejet Engine—A Review of Its Development Potential, U.S. Govern. Report, Monterey, Calif., USA, 1974).

SUMMARY OF THE INVENTION

The engine according to the present invention based on the principle of pulsating combustion and the method according to the present invention for operating the engine have the advantage that the pressure waves produced during pulsating combustion are effectively transmitted to the mechanical driving element. This preferably occurs within the housing, where combustion also takes place. Due to the short transmission paths, less loss of pressure occurs than in the engines known from the related art that are based on this combustion principle. In addition, externally supplied ignition of the fuel/air mixture occurs only while the engine is starting, thus minimizing wear on the ignition components. Because of the inner exhaust gas recirculation that takes place during pulsating combustion, very low system-related $NO_x$ emissions are produced.

The exhaust mechanism for the exhaust gases advantageously opens into the cylinder chamber in which the piston moves. As a result, the piston itself opens and closes the exhaust mechanism according to the stroke sequence of the combustion process.

Because a free-motion piston is used, there is no need for a crank mechanism, which is required in conventional reciprocating engines, thus eliminating the need for lubrication, since no lateral forces are applied to the piston.

To limit the translational motions of the free-motion piston, the piston motion is limited on the side facing away from the combustion chamber by the compressing action of a spring element, which is preferably designed in the form of a helical compression spring.

The translational motions of the piston can be advantageously utilized to operate a generator. For this purpose, a generator is provided on the engine, and the piston motion can be transmitted to a linear rotor of the generator via a piston rod.

The engine, which in this case is designed in the form of a generator, can be advantageously used in an emergency generating set.

A further advantageous application of the engine is to use it as a drive for a compressor, in particular for use in a heat pump.

The intake mechanism of the engine advantageously has a membrane which automatically opens or closes the intake valve for fuel and combustion air, depending on the pressure ratios in the combustion chamber.

Because the combustion chamber already contains combustion air when the engine starts, the elasticity of the membrane is selected so that it unblocks the opening to the combustion chamber based on the fuel pressure applied to one part of the membrane.

DETAILED DESCRIPTION

Figure 2:
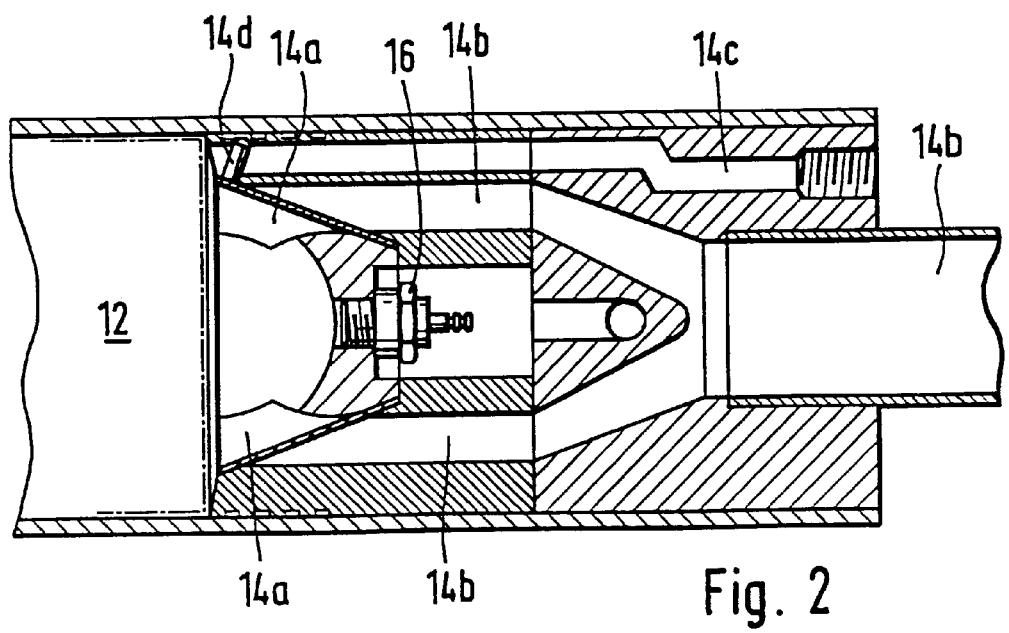
FIG. 2 shows an enlarged intake mechanism of the engine of FIG. 1 for fuel and combustion air.

The engine illustrated in FIG. I has a pressure-resistant housing 10 in which a combustion chamber 12 is located. Combustion gas and combustion air are supplied to combustion chamber 12 via an intake mechanism 14. As shown in FIG. 2, intake mechanism 14 has a membrane 14a which closes a combustion air duct 14b and a combustion gas line 14c in which a nozzle 14d is located. An ignition device in the form of a spark plug 16, which is used to ignite the combustion gas/air mixture when the engine starts, is also provided at the entrance to combustion chamber 12. Combustion chamber 12 has a cylindrical part, referred to below as cylinder 18, in which a piston 20 is arranged so that it can move freely. An exhaust nozzle 22 of an exhaust pipe (not shown) opens into a chamber of cylinder 18. A spiral compression spring 24, whose compressing action limits the translational motion of piston 20, is provided in cylinder 18 on the side of piston 20 facing away from combustion chamber 12. A generator 26 is also connected to the side of piston 20 facing away from combustion chamber 12, with piston 20 being connected to a linear rotor (not shown) of generator 26 via a piston rod 28. Instead of using compression spring 24, it is also possible to fill portion of the cylinder 18 in which compression spring 24 is located with a working gas, the compression of which limits the motion of piston 20.

Figure 1:
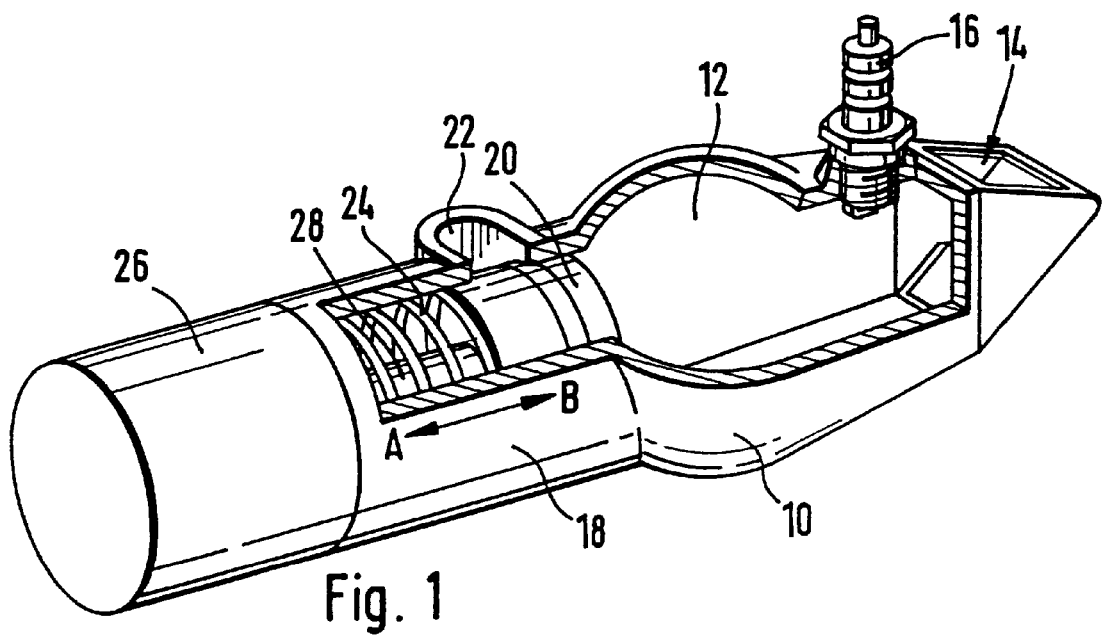
FIG. 1 shows a partially cut-away representation of an engine according to the present invention.

The engine operates according to the known principle of pulsating combustion. When a gas fitting (not shown) opens, combustion gas passes through combustion gas line 14c until it reaches nozzle 14d positioned at the end of combustion fuel line 14c. The gas pressure applied to nozzle 14d is sufficient to lift the portion of shown in FIG. 1 by unloaded compression spring 24. The pulse of the compression wave produced drives piston 20 in the direction of arrow A, thus compressing compression spring 24. When piston 20 releases the opening of exhaust nozzle 22, the compression wave passes through the exhaust pipe nozzle to the outside. Due to the abrupt change in diameter at the open end of the exhaust pipe, the compression wave is reflected in the form of a dilution wave (low-pressure wave) and returns to combustion chamber 12. The dilution wave and the now cool combustion chamber 12 cause a vacuum to form in combustion chamber 12, lifting membrane 14a from its seating until combustion air flows into combustion chamber 12 via combustion air duct 14b and combustion gas flows into it via combustion gas line 14c. The dilution wave has now been partially reflected by intake mechanism 14 and passes through exhaust nozzle 22 and the exhaust pipe connected downstream from exhaust nozzle 22 to the outside. Here, the dilution wave is reflected in the form of a compression wave and enters combustion chamber 12 once again, carrying combustion air and hot residual exhaust gases along with it. The transported residual exhaust gases produce a kind of "internal exhaust recirculation," thus limiting pulsating combustion to values low in $NO_x$. The pressure ratios produced in combustion chamber 12 in the meantime cause membrane 14a to close combustion air duct 14b and nozzle 14d located in combustion gas line 14c. The newly formed combustion gas/air mixture is ignited by the hot residual exhaust gases, causing the pulsating combustion cycle to begin all over again. The exhaust pipe or the engine as a whole is tuned or dimensioned so that the compression wave reflected at the end of the exhaust pipe enters combustion chamber 12 before piston 20 closes exhaust nozzle 22 by moving in the direction of arrow B. Once piston 20 has reached its end position, i.e. when compression spring 24 is unloaded again, the combustion gas/air mixture re-ignites, driving piston 20 back in the direction of arrow A.

The translational motions of piston 20 are transmitted to the linear rotor of generator 26 via piston rod 28, converting the mechanical work performed to electrical energy. An engine of this type, designed as a linear-motion generator, is preferably used as a drive for a portable emergency generating set.

In cases where a power supply is provided for the engine, generator 26 can function as a starter by supplying power for starting the engine as it interacts with piston 20. In doing so, the low-pressure ratios which allow membrane 14a to be lifted from its seating over combustion gas line 14c, thus injecting the combustion gas, are not produced until piston 20 is set in motion.

A further preferred embodiment of the engine is used as a drive for a compression heat pump. In place of generator 26, a compression unit is provided, the compression unit including a compressor to which piston 20 is connected via piston rod 28. The working medium located in the compression unit is compressed by transmitting the stroke motion to the compressor.

What is claimed is:

1. A combustion engine, comprising:
   a pressure-resistant housing including a combustion chamber;
   an intake mechanism through which a fuel and a combustion air are automatically supplied due to changing pressure ratios in the combustion chamber;
   an exhaust mechanism for an exhaust gas produced during a combustion operation and coupled to the combustion chamber;
   a cylinder coupled to the combustion chamber;
   a piston movably arranged in the cylinder; and
   an arrangement for applying a spring energy to the piston on a side of the piston facing away from the combustion chamber;
   wherein the combustion engine is configured to operate in accordance with a pulsating combustion principle.

2. The combustion engine according to claim 1, wherein the cylinder forms one part of the pressure-resistant housing.

3. The combustion engine according to claim 1, wherein:
   the exhaust mechanism opens into a chamber of the cylinder, and
   the exhaust mechanism is closable by the piston.

4. The combustion engine according to claim 1, wherein the piston is formed as a free-motion piston.

5. The combustion engine according to claim 1, wherein:
   the arrangement for applying the spring energy includes a spring element formed as a helical compression spring.

6. The combustion engine according to claim 1, further comprising:
   a generator including a linear rotor; and
   a piston rod having one end coupled to the linear rotor and another end coupled to the piston, wherein a motion of the piston is transmitted to the linear rotor of the generator via the piston rod.

7. The combustion engine according to claim 6, wherein the generator is used in an emergency generating set.

8. The combustion engine according to claim 1, further comprising:
   a compressor unit; and
   a piston rod having one end coupled to the compressor unit and another end coupled to the side of the piston facing away from the combustion chamber.

9. The combustion engine according to claim 8, wherein the combustion engine is used in a compression heat pump.

10. A combustion engine operating in accordance with a pulsating combustion principle, comprising:
    a pressure-resistant housing including a combustion chamber;
    an intake mechanism through which a fuel and a combustion air are automatically supplied due to changing pressure ratios in the combustion chamber;
    an exhaust mechanism for an exhaust gas produced during a combustion operation and coupled to the combustion chamber;
    a cylinder coupled to the combustion chamber;
    a piston movably arranged in the cylinder; and
    an arrangement for applying a spring energy to the piston on a side of the piston facing away from the combustion chamber;
    wherein the intake mechanism includes a membrane for performing on an intake valve one of an opening operation and a closing operation for the fuel and the combustion air depending on a pressure in the combustion chamber.

11. The combustion engine according to claim 10, wherein the membrane exhibits an elasticity sufficient to unblock a fuel intake line leading to the combustion chamber when the combustion engine starts.

12. A method for operating a combustion engine in accordance with a pulsating combustion principle, comprising the steps of:
    performing an automatic intake of a fuel and a combustion air due to changing pressure ratios in a combustion chamber;
    igniting a mixture of the fuel and the combustion air in the combustion chamber in accordance with a first pressure wave;
    producing a second pressure wave upon the ignition of the mixture of the fuel and the combustion air; and
    causing a kinetic energy of the second pressure wave to act upon a piston arranged so as to be movable such that a translational motion of the piston against a spring energy causes the piston to perform on an exhaust mechanism one of an opening operation and a closing operation before the second pressure wave initiates another ignition sequence in the combustion chamber.

13. A method for operating a combustion engine in accordance with a pulsating combustion principle, comprising the steps of:
    performing an automatic intake of a fuel and a combustion air due to changing pressure ratios in a combustion chamber;
    producing a pressure wave upon an ignition of a mixture of the fuel and the combustion air;
    causing a kinetic energy of the pressure wave to act upon a piston arranged so as to be movable such that a translational motion of the piston against a spring energy causes the piston to perform on an exhaust mechanism one of an opening operation and a closing operation before the pressure wave initiates another ignition sequence in the combustion chamber; and
    performing a power stroke sequence according to the steps of:

opening an intake mechanism for the fuel, igniting the mixture of the fuel and the combustion air, opening the exhaust mechanism in response to the translational motion of the piston, wherein the pressure wave is reflected at an open end of the exhaust mechanism, opening the intake mechanism in response to the pressure ratios produced by the reflected pressure wave in the combustion chamber, wherein the pressure wave re-exits and is reflected again at the open end of the exhaust mechanism, closing the intake mechanism in response to the pressure ratios produced by the reflected pressure wave in the combustion chamber, and closing the exhaust mechanism in response to a return motion of the piston before the mixture of the fuel and the combustion air re-ignites.

14. The method according to claim 13, wherein a fuel pressure applied to the intake mechanism when the combustion engine starts is sufficient to open the intake mechanism.

* * * * *

UNITED STATES PATENT AND TRADEMARK OFFICE
CERTIFICATE OF CORRECTION

PATENT NO.   : 6,213,097 B1
DATED        : April 10, 2001
INVENTOR(S)  : Maucher, Beate It is certified that error appears in the above-identified patent and that said Letters Patent is hereby corrected as shown below:

<u>Column 2,</u>
Line 35, insert between the words "of shown", -- membrane 14a sealing off nozzle 14d, so that combustion gas can be injected into combustion chamber 12. Combustion air duct 14b still remains closed by membrane 14a; the combustion air needed for the first ignition process is already located in combustion chamber 12. The engine is started by igniting the combustion gas/air mixture with the aid of spark plug 16, with the sudden rise in pressure in combustion chamber 12 causing membrane 14a to close the combustion gas intake valve once again. The gas mixture, which expands in the form of a compression wave (high-pressure wave), acts upon piston 20, which was placed in the position --

Signed and Sealed this

Twenty-fourth Day of December, 2002

JAMES E. ROGAN
*Director of the United States Patent and Trademark Office*